US012754856B2

(12) United States Patent
Venkat et al.

(10) Patent No.: US 12,754,856 B2
(45) Date of Patent: Oct. 6, 2026

(54) SYSTEM, METHOD, AND COMPUTER READABLE MEDIUM FOR CAPABILITY-ENHANCED VIRTUALIZATION OF CACHES

(71) Applicant: University of Virginia Patent Foundation, Charlottesville, VA (US)

(72) Inventors: Ashish Venkat, Charlottesville, VA (US); Arnabjyoti Kalita, Charlottesville, VA (US); Alenkruth Krishnan Murali, Charlottesville, VA (US); Yilong Yang, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 13 days.

(21) Appl. No.: 19/086,696

(22) Filed: Mar. 21, 2025

(65) Prior Publication Data

US 2025/0298754 A1 Sep. 25, 2025

Related U.S. Application Data

(60) Provisional application No. 63/568,986, filed on Mar. 22, 2024.

(51) Int. Cl.
*G06F 12/14* (2006.01)
*G06F 12/0871* (2016.01)
*G06F 12/1045* (2016.01)

(52) U.S. Cl.
CPC ...... *G06F 12/1491* (2013.01); *G06F 12/0871* (2013.01); *G06F 12/1063* (2013.01); *G06F 12/1433* (2013.01)

(58) Field of Classification Search
CPC ............. G06F 12/1491; G06F 12/0871; G06F 12/1063; G06F 12/1433; G06F 12/0813;
(Continued)

(56) References Cited

U.S. PATENT DOCUMENTS

2020/0019515 A1 * 1/2020 Koufaty ............. G06F 12/1483

OTHER PUBLICATIONS

Yu, J. Z., Watt, C., Badole, A., Carlson, T. E., & Saxena, P. (2023). Capstone: A Capability-based Foundation for Trustless Secure Memory Access. 32nd USENIX Security Symposium (USENIX Security 23), 787â804. https://www.usenix.org/conference/usenixsecurity23/presentation/yu-jason (Year: 2023).*

* cited by examiner

*Primary Examiner* — Reginald G Bragdon
*Assistant Examiner* — Zakaria Mohammed Belkhayat
(74) *Attorney, Agent, or Firm* — Thomas | Horstemeyer, LLP

(57) ABSTRACT

An exemplary computing method of the present disclosure comprises processing a data request by translating a virtual memory address and a trust domain identifier associated with a thread being executed into a capability token that is associated with a physical capability register; determining that a cache line in cache memory of the computing device is allocated to the virtual memory address included in the data request; searching for and retrieving contents of the physical capability register that is associated with the capability token value; and granting access to the cache line in the cache memory if the contents of the physical capability register indicate that the cache line is one of the one or more cache line numbers that are allocated to the capability token associated with the thread being executed and the set of operations permit access to the cache line.

20 Claims, 11 Drawing Sheets

(58) Field of Classification Search
CPC ............. G06F 12/0811; G06F 12/1036; G06F 12/0864; G06F 12/0895; G06F 12/145; G06F 12/1475; G06F 12/0842; G06F 2212/1052; G06F 2212/657
See application file for complete search history.

SYSTEM, METHOD, AND COMPUTER READABLE MEDIUM FOR CAPABILITY-ENHANCED VIRTUALIZATION OF CACHES

CROSS-REFERENCE TO RELATED APPLICATION

This application claims priority to co-pending U.S. provisional application entitled, "System, Method, and Computer Readable Medium for Capability-Enhanced Virtualization of Caches," having application No. 63/568,986, filed Mar. 22, 2024, which is entirely incorporated herein by reference.

STATEMENT OF GOVERNMENT INTEREST

This invention was made with government support under 2238548 awarded by the National Science Foundation. The government has certain rights in the invention.

BACKGROUND

Modern systems make extensive use of resource virtualization to achieve high hardware utilization and minimize the total cost of ownership. However, sharing of physical computing resources invariably opens the door to side-channel exploitation where co-located attackers are able to covertly examine a victim's behavior and/or steal private information. Even though individual applications do not share data, they still compete for shared physical resources, notably for cache capacity. Since cache lookup is optimized to be data/address-dependent, even the presence or absence of data in the cache can reveal sensitive information.

SUMMARY

Embodiments of the present disclosure include hardware-based virtualization systems and related methods that enable the secure allocation and use of cache resources. One such system involves a computing device comprising a processor and a memory; and machine-readable instructions stored in the memory that, when executed by the processor, cause the computing device to at least: execute a thread of programmable instructions, wherein the thread includes a request for data to be retrieved from the memory, wherein the request for data includes a virtual memory address; and process the request for the data by: translating the virtual memory address and a trust domain identifier associated with the thread being executed into a capability token value that is associated with a physical capability register, where the capability register contains one or more cache line numbers that are allocated to a capability token associated with the thread being executed, a permissions vector that defines a set of operations allowed on the allocated cache lines, and a physical memory tag for each of the cache line numbers contained in the capability register; determining that a cache line in cache memory of the computing device is allocated to the virtual memory address included in the request for data; searching for and retrieving contents of the physical capability register from a capability lookaside buffer that is associated with the capability token value; and/or granting access to the cache line in the cache memory to the thread being executed if the contents of the physical capability register indicate that the cache line is one of the one or more cache line numbers that are allocated to the capability token associated with the thread being executed and the set of operations, defined by the permissions vector, allowed on the allocated cache lines permit access to the cache line.

The present disclosure can also be viewed as a hardware-based virtualization computing methods comprising executing, by a computing device, a thread of programmable instructions, wherein the thread includes a request for data to be retrieved from memory of the computing device, wherein the request for data includes a virtual memory address; and processing, by the computing device, the request for the data by: translating the virtual memory address and a trust domain identifier associated with the thread being executed into a capability token value that is associated with a physical capability register, where the capability register contains one or more cache line numbers that are allocated to a capability token associated with the thread being executed, a permissions vector that defines a set of operations allowed on the allocated cache lines, and a physical memory tag for each of the cache line numbers contained in the capability register; determining that a cache line in cache memory of the computing device is allocated to the virtual memory address included in the request for data; searching for and retrieving contents of the physical capability register from a capability lookaside buffer that is associated with the capability token value; and/or granting access to the cache line in the cache memory to the thread being executed if the contents of the physical capability register indicate that the cache line is one of the one or more cache line numbers that are allocated to the capability token associated with the thread being executed and the set of operations, defined by the permissions vector, allowed on the allocated cache lines permit access to the cache line.

The present disclosure can also be viewed as a hardware-based virtualization computer-readable medium (e.g., non-transitory computer-readable medium) comprising machine-readable instructions that, when executed by a processor of a computing device, cause the computing device to at least: execute a thread of programmable instructions, wherein the thread includes a request for data to be retrieved from the memory, wherein the request for data includes a virtual memory address; and process the request for the data by: translating the virtual memory address and a trust domain identifier associated with the thread being executed into a capability token value that is associated with a physical capability register, where the capability register contains one or more cache line numbers that are allocated to a capability token associated with the thread being executed, a permissions vector that defines a set of operations allowed on the allocated cache lines, and a physical memory tag for each of the cache line numbers contained in the capability register; determining that a cache line in cache memory of the computing device is allocated to the virtual memory address included in the request for data; searching for and retrieving contents of the physical capability register from a capability lookaside buffer that is associated with the capability token value; and/or granting access to the cache line in the cache memory to the thread being executed if the contents of the physical capability register indicate that the cache line is one of the one or more cache line numbers that are allocated to the capability token associated with the thread being executed and the set of operations, defined by the permissions vector, allowed on the allocated cache lines permit access to the cache line.

In one or more aspects for such systems, methods, and/or devices, the permissions vector is burned into the physical capability register to indicate whether the allocated line can be read from, written to, invalidated, or shared; and/or multiple threads of programmable instructions are associated with a same capability token, wherein a translation of a first trust domain identifier for a first thread and a first virtual memory address produces a first capability token and a translation of a second trust domain identifier for a second thread and a second virtual memory address produces the same first capability token, wherein the multiple threads include the first thread and the second thread.

In one or more aspects, such systems, methods, and/or devices comprise or are configured to verify the physical memory tag in the capability register against a physical address obtained from a transaction-lookaside buffer of the computing device; add a new cache line to the cache memory in response to detection of a cache miss for a requesting thread of programmable instruction; and/or issue a new capability token in the capability lookaside buffer, where the new capability token is associated with a physical capability register that specifies the new cache line and a new set of permission vectors associated with the new cache line.

In one or more aspects for such systems, methods, and/or devices, the addition of the new cache line is automatically authorized to be added to the cache memory for the requesting thread when a total number of cache lines allocated to the requesting thread is less than or equal to a predefined soft limit value; and/or the addition of the new cache line is added to the cache memory for the requesting thread as a replacement to a current cache line entry in the cache memory when a total number of cache lines allocated to the requesting thread is more than a predefined hard limit value.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
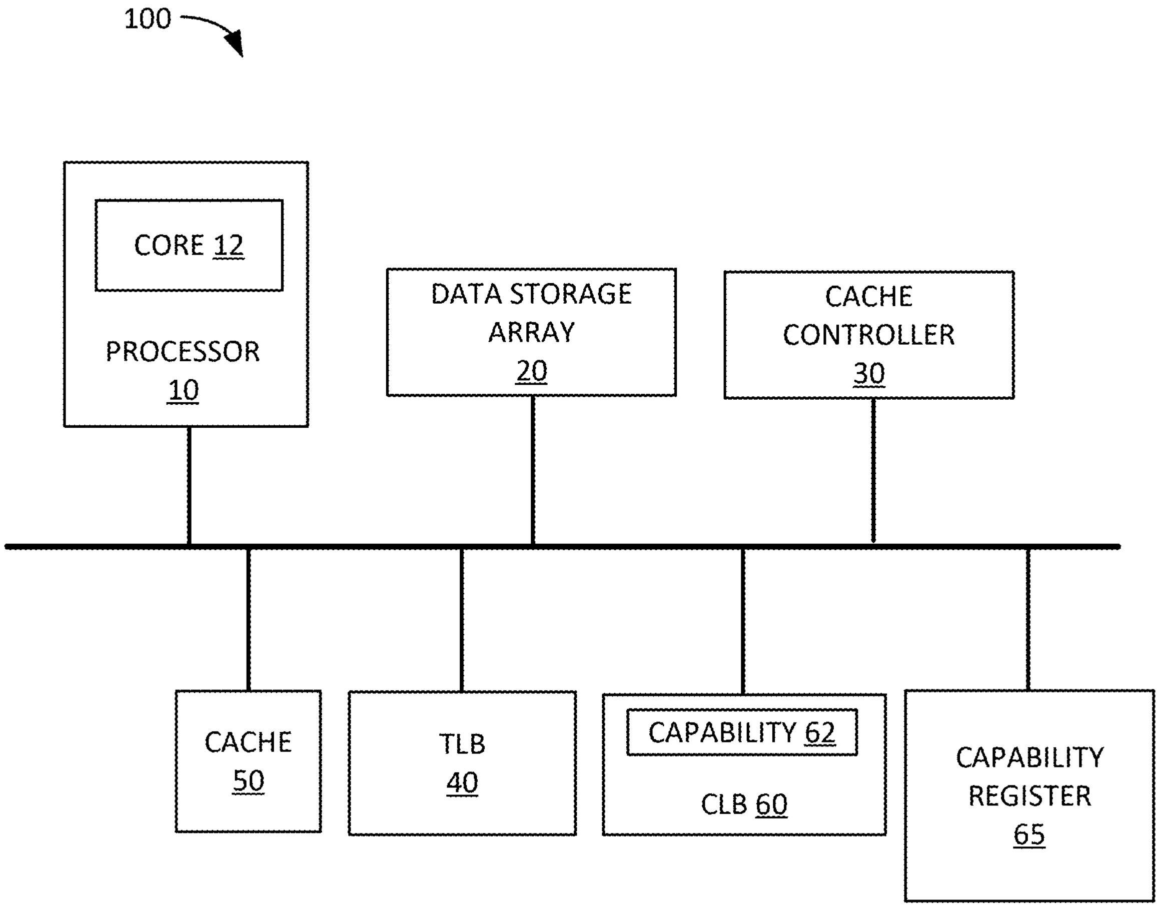
FIG. 1A shows an exemplary hardware-based virtualization system in accordance with various embodiments of the present disclosure.

The present disclosure presents hardware-based virtualization systems and related methods that enable the secure allocation and use of cache resources. Referring to FIG. 1A, an exemplary computing system 100 of the present disclosure features a computing device having one or more computer processors 10 that can be a single core processor or a multicore processor such that each core 12 can execute a thread of programmable instructions, such as from a software application. Accordingly, in executing a thread, an instruction executed by the processor core 12 can request for data to be retrieved from a data storage array 20, where the request is processed by a cache controller 30. As such, the cache controller 30 is configured to perform a directory lookup in a transaction look aside buffer (TLB) 40 to translate a virtual or logical data/memory address provided by the instruction into a physical memory address within the data storage array 20 corresponding to the requested data and determine if cache line data is currently stored in cache memory 50 (that can include L1 cache, L2 cache, and/or L3 cache structures) that includes the requested data. Correspondingly, the cache controller 30 is also configured to perform a directory lookup in a capability lookaside buffer (CLB) 60 by converting or translating the virtual or logical data/memory address and a trust domain identifier associated with the thread being executed into a capability token value 62 that is linked to or associated with a physical capability register 65, where the capability register 65 contains the cache line number the capability token provides access to and its physical address, along with the allowed set of operations (i.e., read, write, invalidate, and share) on that cache line. In various embodiments, the cache controller 30 may also be configured to compare the physical address in the capability register 65 against the physical address obtained from the TLB access to ensure that the CLB entry does not point to a stale capability. Subsequent operations of the system are further described in the passages that follow.

Accordingly, an aspect of an embodiment of the present disclosure provides, among other things, a hardware virtualization strategy that allows for the secure allocation and use of physical cache resources among threads or sequences of instructions that belong to different trust domains. An aspect of an embodiment of the present disclosure enables, among other things, a capability-based cache lookup by translating a given virtual memory address (VA) and trust domain identification (ID) pair into a capability token 62 that encodes the access rights and the allowed set of operations on the physical cache line that it grants access to. By constraining cache lookup to occur based on a capability, an aspect of an embodiment of the present disclosure can achieve, but is not limited thereto, fine-grained partitioning of the cache 50 at the granularity of a cache line, enforcing a wide set of confidentiality, availability, and/or fairness guarantees, while maximizing cache utilization. This disclosure presents detailed design mechanisms, policies, and optimizations along with extensive evaluation to demonstrate the feasibility of an aspect of an embodiment of the present disclosure integrating the secure virtualization layer into modern multicore cache hierarchies.

Through Register Transfer Level (RTL) and McPAT (Multicore Power, Area, and Timing) analyses, this disclosure shows that caches associated with an aspect of an embodiment of the present disclosure do not interfere—with existing SRAM array macros, with the total chip area overhead due to the additional layer of virtualization amounting to just 10.2%. The caches associated with an aspect of an embodiment of the present disclosure offer protections at all levels of the cache hierarchy and incur an average performance degradation of 4.7% when compared to an insecure baseline, while outperforming a partitioning-based secure baseline by 14.8% due its ability to gracefully scale to a large number of domains.

Resource virtualization and access control have formed the bedrock of modern computing systems. By abstracting physical resources into virtualized pools, operating systems and hypervisors enable secure, flexible, and on-demand resource allocation among the users of a system, while maintaining fairness and maximizing utilization. However, organizing shared microarchitectural resources such as cache memory 50 into virtualized pools in a secure, efficient, and scalable manner continues to be a challenging endeavor.

Current virtualization solutions such as those that use Page Coloring and Intel's Cache Allocation Technology (CAT) rely on providing exclusive access to all or specific partitions of the cache by pinning particular sets or ways, thereby minimizing interference among co-located programs or virtual machines in the system. However, due to their inherent inflexibility in organizing the cache into fine-grained partitions, they often suffer from low utilization and prohibitively high performance degradation when the number of trust domains is scaled beyond a certain point. Moreover, these solutions have been shown to be vulnerable to side-channel inference through indirect confused-deputy attacks and cache occupancy attacks.

An aspect of an embodiment of the present disclosure provides, among other things, a hardware-based virtualization system that enables the secure allocation and use of cache resources at the cache line granularity, as governed by the principles of least privilege and intentionality. An aspect of an embodiment of the present disclosure enforces a number of novel and nonobvious features, elements, and characteristics, such as but not limited thereto, as follows. First, each entity in the system is granted access to only those cache lines that have been specifically allocated to it and the set of operations that may be performed on such lines is restricted to the bare minimum it needs to accomplish its task. Accordingly, in various embodiments, an entity could include one or more threads executed by a processor 10 within the same trust domain. Second, no entity in the system is allowed to perform a cache operation without explicitly asserting their access rights. Third, to ensure fairness and availability, the allocation of cache resources is constrained by predefined hard and soft limits. One of the keys, among others, to an aspect of an embodiment of the present disclosure, is the notion of a capability-based cache lookup, wherein a capability 62 (e.g., a secure token granting access to a physical resource) is issued upon the successful allocation of a cache line during miss handling, and subsequent accesses to that line are granted only upon presenting the capability. Accordingly, systems and methods of the present disclosure introduce a secure layer of virtualization that translates a given address-trust domain ID pair into its corresponding capability, if available (e.g., if data at that address has been allocated a cache line). Each capability may be then implemented using a physical register 65 that contains the cache line number it provides access to, along with the allowed set of operations (i.e., read, write, invalidate, and share) on that line. An important property of capabilities is that they are unforgeable, which means the contents of a capability once burned or permanently recorded, may not be modified, thereby restricting an entity to the access rights and permissions encoded in it at the time of allocation. During its lifetime, a capability 62 may be copied to allow secure and intentional sharing of cache lines with other entities in the system, as long as its permissions vector allows sharing. Since capabilities are implemented as registers, entities sharing a cache line may simply map to the same physical register 65, greatly simplifying the effort required for tracking and managing copies of capabilities. Further, a capability 62 may also be revoked by releasing the register back into the free pool, allowing entities to intentionally and gracefully give up access to the cache lines they are in possession of. An important consequence of this new layer of virtualization is that it breaks the tight coupling of the address bits to the actual physical location (e.g., set number) of the cache line, allowing an allocation manager 130 (FIG. 10) of the cache controller 30 to pick any available cache line to place data in (mimicking fully-associative caches), thereby limiting address-dependent (and by extension, data-dependent) contention, while simultaneously enabling a direct-mapped lookup as the capability already contains the line number. Note that this has important security and performance implications.

First, by allowing the physical location of a cache line to be independent of its address, conflict-based cache attacks that rely on constructing eviction sets based on address-dependent contention can be significantly limited. Second, since capability revocation needs to be voluntary, intentional, and explicit, invalidation of a cache line may only be triggered in the case of self-evictions (e.g., the eviction of an entity's own cache lines where an entity could include one or more threads executed by a processor within the same trust domain). In essence, this ensures that distrusting parties cannot force the eviction of each other's cache lines. Third, the ability to explicitly disallow the sharing of cache lines among distrusting parties (by specifying it in a capability's permission vector) prevents flush-based cache attacks that hinge on flushing shared lines. Fourth, an exemplary embodiment of the present disclosure reaps the performance benefits of a flexible conflict-averse fully associative allocation and a fast direct-mapped lookup, greatly amortizing the cost of the extra translation step.

In addition to combating confidentiality violations, an exemplary embodiment of the present disclosure is also able to ensure availability and fairness, by imposing hard and soft limits on the number of capabilities granted to any given entity. The soft limit forms the basis of a minimum guarantee-resource allocation, while the hard limit enforces that no single entity in the system is allowed to monopolize available cache capacity. While this allows entities to grow beyond the soft limit to maximize cache utilization, in the event that some other entity has not reached its soft limit and needs to allocate additional cache lines, it also ensures that they give up cache lines slowly and steadily through a gradual revocation process (e.g., once every 100,000 cycles) that highly limits the rate at which cache occupancy information is revealed. Furthermore, by reconfiguring soft limits, an exemplary embodiment can seamlessly scale to multiple protection domains as opposed to existing solutions where the partitioning is coarse-grained and limited by either the number of sets or the associativity of the cache.

Key contributions of an aspect of an embodiment of the present disclosure include, but are not limited to, introducing a novel capability-based hardware virtualization solution that allows for the secure allocation and use of cache resources among multiple entities in a system, enforcing key security properties that protect against conflict-based, flush-based, occupancy-based, denial-of-service, and confused deputy attacks; and presenting detailed design mechanisms and policies, including hit procedures, miss handling, replacement policies, and coherence logic, that together enable its integration in a modern multi-level cache hierarchy. Through RTL analysis and McPAT estimations, it is shown that the disclosed solution does not impact SRAM layout and only entails its integration with a new virtualization layer, imposing an area overhead of 10.2% and power overhead of 2.5%.

By introducing an additional layer of virtualization, an embodiment of the present disclosure is able to break the tight coupling between the address bits and the physical location of a cache line, enabling a direct-mapped organization with fully associative allocation, greatly amortizing the cost of virtualization. It is observed that an exemplary system and method of the present disclosure incur an average of 4.7% performance degradation on single-threaded and 14.8% on multithreaded workloads, over an insecure baseline, but outperforms a secure baseline with cache partitioning by an average of 19.4%. The present disclosure shows that an exemplary system and method of the present disclosure have the ability to seamlessly scale to multiple trust domains while maintaining high cache utilization and low miss rates through the mere reconfiguration of its soft limits that constrain the allocation of capabilities.

Capability-based security was introduced by Saltzer and Schroeder, see M. K. Qureshi, "CEASER: Mitigating Conflict-Based Cache Attacks via Encrypted-Address and Remapping," MICRO (2018), and there have been several hardware and software approaches proposed since to enforce capability-based protection. These systems enforce the principle of least privilege providing every user with the least set of permissions and privileges required to accomplish its goal, enforced through capabilities that authorize specific operations on a given resource. They also enforce the principle of intentionality by stipulating that, for every access, users explicitly assert their access rights. Capabilities, by definition, are unforgeable, which means once the privileges in it are burned, they cannot be altered. However, copies of capabilities can be created for secure delegation of access rights.

Side-channel attacks that target the cache exploit the liming differences between hits and misses to observe and draw inferences about a victim's sensitive data-dependent cache access patterns. These attacks can be broadly classified into (a) contention-based attacks that hinge on competing for cache lines that map to the same cache set in a conventional set-associative cache, and (b) reuse-based attacks that rely on instructions exposed by the hardware to flush a particular cache line that contains data shared by the attacker and the victim (e.g., in case of shared libraries or memory deduplication). Reuse-based attacks also include those that exploit coherence protocols to force invalidations or generate other observable timing signals. In either case, the hit/miss timing behavior for secret data-dependent accesses could be used to ultimately deduce the secret.

Multiple secure cache designs have been proposed in response to micro-architectural attacks that have targeted the cache as the dominant side channel. These designs fall into two major categories. First, hardware cache partitioning solutions aim at mitigating cache attacks by constraining distrusting threads to different partitions in the cache. For example, CATalyst supports two trust domains by assigning two last-level cache (LLC) ways to a secure domain at boot time, thereby reserving the remaining eighteen ways for the insecure domain. See Albert Kwon, et al., "Low-Fat Pointers: Compact Encoding and Efficient Gate-Level Implementation of Fat Pointers for Spatial Safety and Capability-Based Security, Proceedings of the ACM Conference on Computer and Communications Security (2013). PLCache secures the L1 data cache by locking lines of interest for creating flexible partitions and disallowing cross-partition eviction. See Z. Wang et al., "New Cache Designs for Thwarting Software Cache-Based Side Channel Attacks," ISCA (2007). Similarly, in NoMo cache, defenses for L2 and L3 caches are out of scope but it allows for flexible partitioning of the L1 between two simultaneous multithreading (SMT) threads. See L. Domnitser et al., "Non-Monopolizable Caches: Low-Complexity Mitigation of Cache Side Channel Attacks," TACO (2012). SecDCP offers LLC protection by ensuring one-way information flow from public to confidential applications but it allows for dynamically changing the partition size using cache demand information. See Y. Wang et al., "SecDCP: Secure Dynamic Cache Partitioning for Efficient Timing Channel Protection," DAC (2016). In contrast to these approaches, DAWG secures all levels of the cache through coarse-grained way partitioning that isolates the visibility of any cache state changes to a single protection domain. See V. Kiriansky et al., "DAWG: A Defense Against Cache Timing Attacks in Speculative Execution Processors," MICRO (2018). MI6 uses page coloring-based set partitioning that maps pages from distrusting domains to disjoint cache sets. See T. Bourgeat et al., "Mi6: Secure Enclaves in a Speculative Out-of-Order Processor," Proceedings of the 52nd Annual IEEE/ACM International Symposium on Microarchitecture, New York, NY, USA: Association for Computing Machinery (2019), p. 42-56. Second, randomization-based solutions aim at randomizing the allocation and access procedures for the cache, thereby preventing deterministic conflict behavior. SCATTERCache secures shared L2 caches in embedded ARM processors by randomizing the mapping of address to cache set using a key, tag-index pair, and domain ID. See M. Werner et al., "Scattercache: Thwarting Cache Attacks Via Cache Set Randomization," Proceedings of the 28th USENIX Conference on Security Symposium (2019), p. 675-692. The random fill cache replaces the demand L1 data cache by another random fill within a neighborhood window so as to not completely forgo the advantages due to locality. See F. Liu et al., "Random Fill Cache Architecture," ISCA (2014). Similarly, Newcache introduces a layer of indirection in the L1-I and L1-D caches where the address is first mapped to a logical direct-mapped (LDM) cache and then each LDM cache line is mapped in a fully associative and randomized way to a physical cache line. See F. Liu et al., "Newcache: Secure Cache Architecture Thwarting Cache Side-Channel Attacks," MICRO (2016). MIRAGE leverages the V-way cache design to allow for global random LLC evictions at an extra tag storage cost In contrast to the former randomization approaches. See G. Saileshwar et al., "MIRAGE: Mitigating Conflict-Based Cache Attacks with a Practical Fully-Associative Design," USENIX Security Symposium (2020). CEASER leverages encryption to achieve randomization where a low-latency block cipher converts the physical line address into an encrypted line address in the shared LLC. SHARP, on the other hand, changes the replacement policy such that attacker-induced evictions do not generate inclusion victims in the private caches of the victim process. See M. Yan et al., "Secure Hierarchy-Aware Cache Replacement Policy (SHARP): Defending Against Cache-Based Side Channel Attacks," 2017 ACM/IEEE 44th Annual International Symposium on Computer Architecture (ISCA) (2017), pp. 347-360. While the present solution falls into the partitioning based approach, it not only enforces a greater set of security properties, but also protects all cache levels, including the instruction caches, while being able to scale gracefully to several protection domains.

One of the goals of the present disclosure is to enable, among other things, secure and scalable virtualization of cache resources among threads that belong to different trust domains, such that each thread of instructions executed by a processor owns exclusive access rights to the cache lines allocated to it (unless explicitly shared), and its cache timing behavior may not be influenced by threads from a different trust domain. In various embodiments, systems and methods of the present disclosure enforce the following security properties.

Access based on Least Privilege—Each thread is allowed to access only those lines that have been allocated to it and the set of operations (i.e., read, write, invalidate, share) that they can perform on the line are limited to the bare minimum needed. This not only allows for strictly partitioning cache resources among mutually distrusting domains, but enables the flexible enforcement of fine-grained permissions. For example, this could allow a line to be shared as read-only among multiple threads, with the caveat that it may not be invalidated by a thread outside of its trust domain.

Unforgeability of Access Rights—The access rights and permissions of a line are incorporated into capabilities that are conferred upon a thread at the time of line allocation. It is enforced that these capabilities are unforgeable, in that the contents of the register holding the access rights and permissions may not be altered, once burned. However, other threads may hold copies of the capability by linking to the same physical register if sharing is allowed. Note that this prevents the Confused Deputy problem as authorization is still based on the permissions encoded in the capability, regardless of what entity performs the access. See N. Hardy, "The Confused Deputy: (or Why Capabilities Might Have Been Invented)," ACM SIGOPS Operating Systems Review (1988). In other words, capability-based protection inherently ensures that a privileged entity deputized by an attacker would still perform accesses using the access rights delegated to it by the attacker (achieved via sharing of capabilities), rather than its own access rights.

Voluntary Revocation—It is enforced that capabilities owned by a thread may not be revoked involuntarily outside of its trust domain. This allows for implementing strict policies where cache line invalidation and replacement operations are restricted to always occur within a trust domain, mitigating several contention-based, flush-based, and occupancy-based attacks that hinge on evicting lines outside of their domain. Further, once a capability is revoked, all links to it, Nill instantly and automatically be suspended, preventing use-after-free-style misuse of capabilities.

Intentionality—No cache operations are allowed unless access rights are explicitly exercised through capabilities. Even though a thread has access to multiple lines through different capabilities, each cache operation it undertakes needs to be explicitly tied to and authorized by the corresponding capability. By supplanting the global notion of access rights in favor of fine-grained capabilities, resources and delegate access rights are able to be securely shared with other entities, preventing confused deputy scenarios.

Address-Independent Cache Access—The additional layer of virtualization allows for enforcing that virtual or physical memory address bits do not directly influence the physical location of a cache line, significantly limiting conventional eviction set construction that relies on address-dependent contention.

Availability—It is enforced that any given entity in the system will neither be deprived of allocating cache lines up to a minimum guaranteed limit, nor be allowed to exceed its maximum allocation limit. These limits can be specified per-thread or per-domain, so as to mitigate attacks that rely on exploiting occupancy behavior.

While software may be provided with the flexibility to freely organize into trust domains, maintain trust domain IDs in a dedicated model-specific register, and establish trust relationships as appropriate, in certain embodiments, it is assumed that hardware modules within the cache controllers 30 responsible for creating and maintaining capabilities, verifying access rights, and performing cache operations are all trusted and tamper-resistant.

The following discussion only considers a single-level cache and a single-core, single-threaded processor (e.g., executes one stream of instructions at a time). However, in other embodiments of the present disclosure, detailed design mechanisms that enable their integration in modern multi-threaded (e.g., executes multiple streams of instructions at a time) and multicore processors (having two or more processing units or cores) that feature a multi-level cache hierarchy are disclosed.

Current private caches are typically logically or virtually-indexed and physically-tagged, allowing them to index into the appropriate cache set using index bits derived from the virtual address (VA), while performing address translation in parallel using the Translation-Lookaside Buffer (TLB) 40. The tag bits from the physical address (PA) are then used to perform an associative lookup of the cache line within that set through parallel tag comparisons.

Figure 1B:
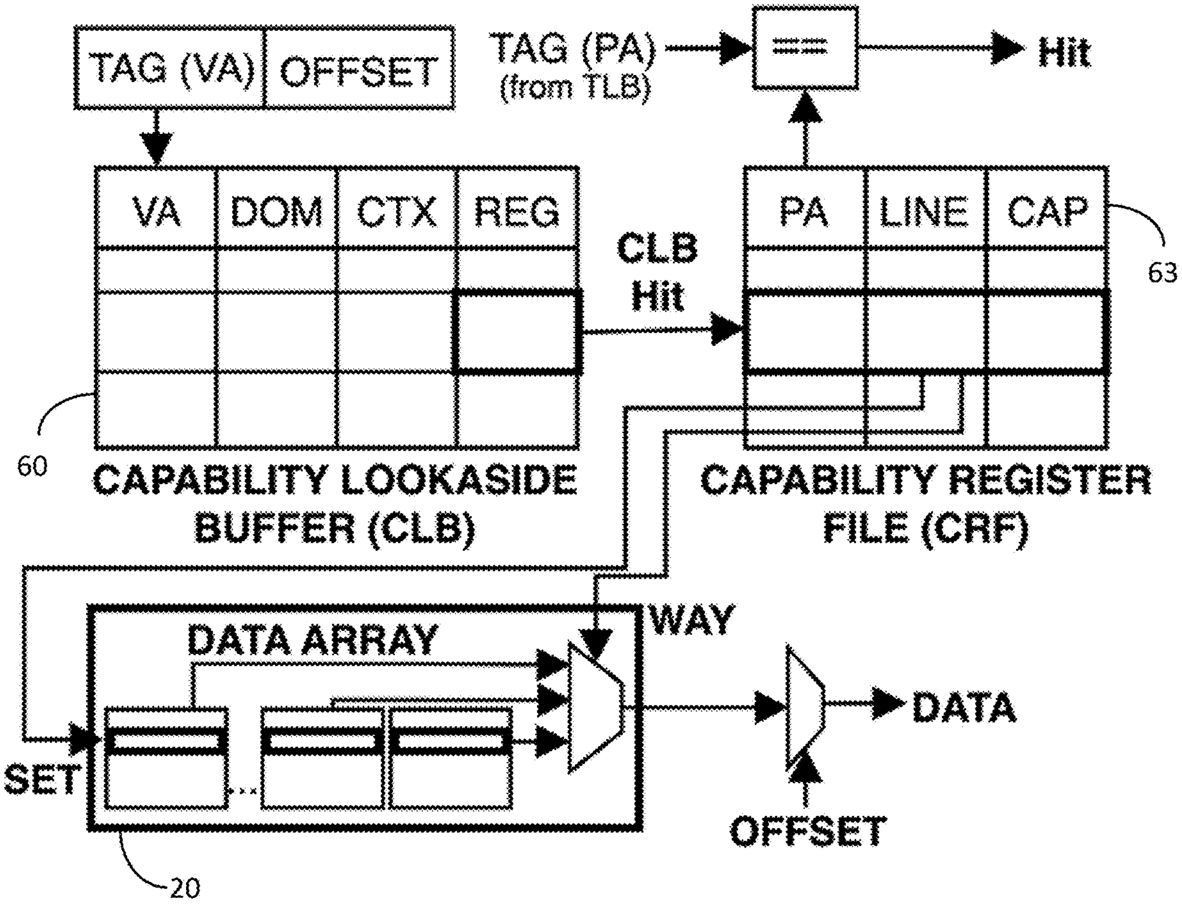
FIG. 1B demonstrates an exemplary cache hit procedure in accordance with various embodiments of the present disclosure.

In contrast and in accordance with the present disclosure, as demonstrated by FIG. 1B, exemplary L1 caches employ an additional layer of virtualization to translate a virtual address (VA) and domain ID (DOM) pair to a capability 62 using the Capability-Lookaside Buffer (CLB) 60. In various embodiments, the CLB 60 is organized as content-addressable memory (CAM) similar to TLBs. If a valid translation exists in the CLB 60, the appropriate entry would point to a capability register (REG) 65.

In accordance with various embodiments, each capability register 65 specifies the cache line (LINE) it provides access to, along with a permissions vector (CAP) that indicates the set of authorized operations (read, write, invalidate, and share) that may be performed on it. In various embodiments, capability registers 65 are stored in a separate physical capability register file (CRF) 63 that is maintained as part of the cache controller 30. Both the capability register file and the CLB are provisioned to contain as many entries as the number of lines in the L1 cache (512 entries for the instruction cache and 768 entries for the data cache). Once the capability register 65 is identified, access rights are verified to explicitly ensure that the desired operation is allowed before accessing the cache 50.

Figure 2A:
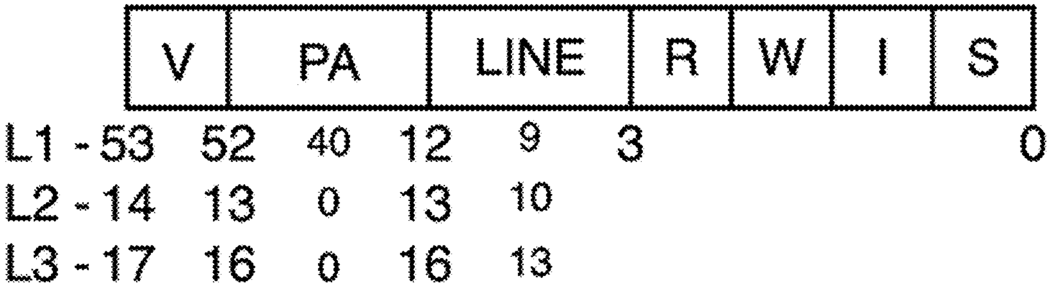
FIG. 2A depicts a capability register in accordance with various embodiments of the present disclosure.

In current caches, a cache miss would entail line allocation and line fill operations, as governed by the cache's insertion and replacement policies. In caches of an aspect of an embodiment of the present disclosure, it is first establish that a valid virtual address to capability translation is not found in the CLB 60, in which case a new line will need to be allocated and a new capability 62 will need to be issued with the appropriate access rights. To this end, a free pool of capability registers 65 and cache lines are maintained, similar to the physical register allocation logic used in out-of-order processors. If a free register is available, a new capability (shown in FIG. 2A) is generated as follows.

First, a cache line is pulled from another free pool that maintains invalid lines, and that line number is recorded in the capability. Note that this mimics a fully associative allocation in that data is allowed to be placed in any available cache line upon a miss, without regard to its address. If the free pool is empty, a secure cache replacement procedure is triggered. For all future accesses, the line number is used to directly identify the particular set and way in the cache at which the line exists.

Figure 2B:
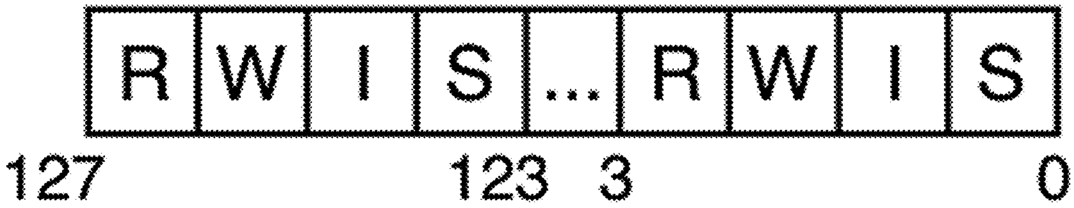
FIG. 2B depicts model-specific register encoding cross-domain sharing policies in accordance with various embodiments of the present disclosure.

Second, a permissions vector is burned into the register 65 to indicate whether the allocated line can be read from, written to, invalidated, and/or shared. In various embodiments, the following rules are employed to populate the permissions vector: (a) a write bit in the permissions vector is not set if a backing store in the lower-level cache (or the page table entry, when the backing store is not available, e.g., if it is the last inclusive cache in the hierarchy) indicates that it contains read-only or execute-only content; (b) a share bit is set if the thread intends to share the line outside of its trust domain; and (c) an invalidate bit is set if the thread voluntarily permits the line to be invalidated by any thread outside of its trust domain. Note that the latter two policies are implemented per-thread and cache-wide, and can be configured by software through model-specific registers (as shown in FIG. 2B) that maintain a bit vector indicating whether a shared cache line owned by the current domain is readable, writable, flushable or shareable outside of its domain. The rules together allow for significant flexibility. For example, although not desired, in systems that are less security-conscious, a highly permissive policy could be implemented by turning on all bits in the capability. A more restrictive policy could be implemented by turning off only the write and invalidate bits, allowing read-only sharing across trust domains. Finally, a strict no-sharing across trust domains policy could be implemented by turning off the share and invalidate bits in the capability. In various embodiments, this latter policy is implemented by default.

Third, as soon as the TLB access is complete and the physical address (PA) is available, the physical tag bits are burned into the capability register 65. For all future accesses, the physical tag in the capability register 65 is compared against that obtained from the TLB access. This ensures that a CLB entry does not point to a stale capability, preventing use-after-free-style misuse.

Finally, the capability register number itself is recorded in the CLB entry, and once released out of the free pool, the register file write logic would ensure that no further writes to it are allowed, preserving the unforgeability property.

Figure 3A:
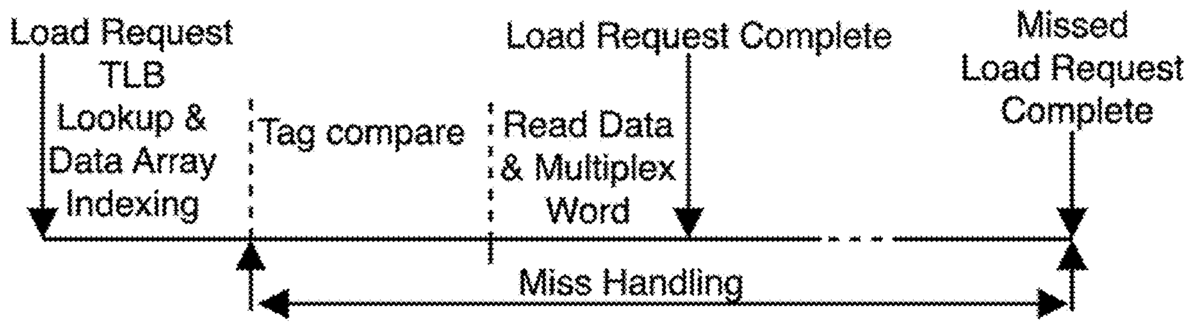
FIGS. 3A-3B show timing diagrams for operations of accessing (a) a baseline cache system and (b) an exemplary cache system in accordance with various embodiments of the present disclosure.
Figure 3B:
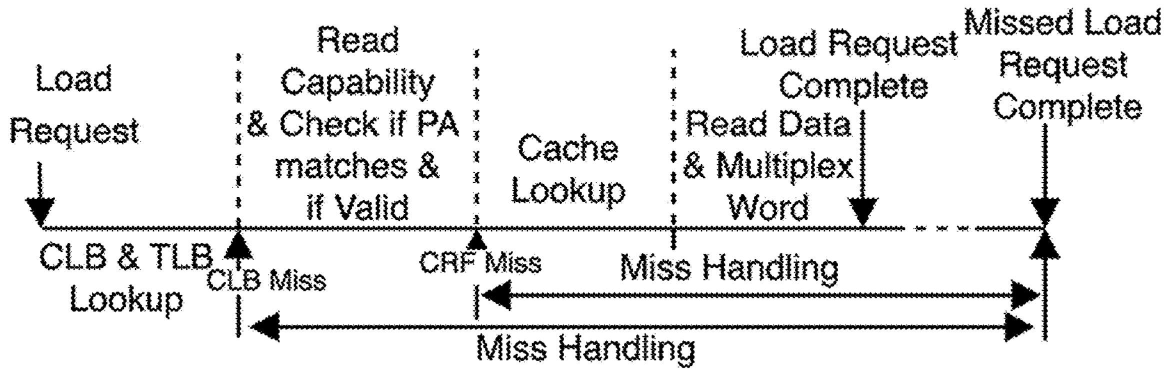

FIGS. 3A and 3B show the timing diagram comparing an L1 data cache access for an exemplary embodiment and a set-associative baseline. While most steps can overlap, the extra layer of indirection in the exemplary embodiment imposes an additional cycle delay. However, in the inventors' evaluation, they find that the disclosed conflict-averse fully associative allocation strategy greatly alleviates this overhead.

Figure 4:
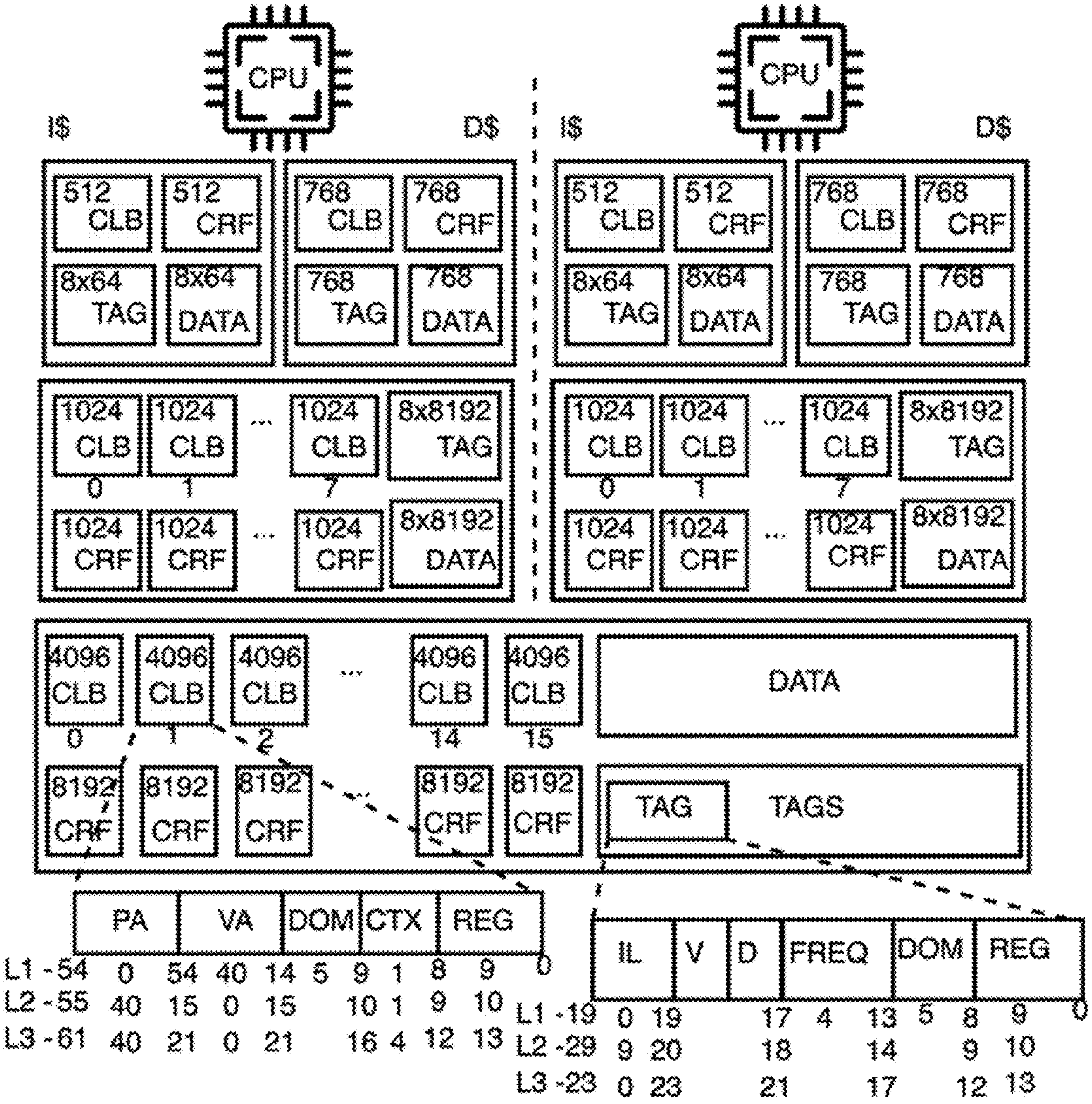
FIG. 4 shows the organization of exemplary caches in a multi-level hierarchy, in accordance with various embodiments of the present disclosure

Next, FIG. 4 shows the organization of exemplary caches in a multi-level hierarchy, in accordance with various embodiments of the present disclosure. Each cache 50 in the hierarchy maintains its own set of capabilities to provide secure access to the lines contained in it and is equipped with a dedicated CLB 60 and a capability register file 63. In the L1 data and instruction caches, the CLBs 60 and capability register files 63 are organized as single bank structures that contain as many entries as the number of cache lines. However, due to the relatively larger number of cache lines in the private L2 cache and the shared last-level cache (LLC), their CLBs 60 and capability register files 63 are split into multiple banks to enable fast access to entries within each individual bank while also allowing multiple banks to be probed in parallel. Each CLB bank is implemented as a CAM, albeit addressed using the physical address (40 bits) and domain ID (5 bits) pair at the L2 and L3 levels. Since the L2 and L3 CLBs are physically addressed, the physical tag bits do not need to be stored in the capability register and thus smaller capability register files may be used at the L2 and L3 levels.

In various embodiments, each CLB 60 is also supplemented with a dedicated per-thread capability table that acts as its backing store and resides in protected shadow memory that can only be accessed through internal commands initiated by the cache controller 30 to write-through or writeback a CLB entry. While the L2 and last-level CLBs implement a write-through policy requiring a capability table update upon every capability issue and revocation operation (which only occur in the event of a miss), the L1 CLB implements an atomic writeback policy, forcing the CLBs (512 and 768 entries in L1I and L1D respectively) to be written back in entirety to their respective capability tables upon a CLB flush operation (which only occurs upon a context (CTX) switch).

To curb the storage overhead, the last-level CLB tracks only a subset of the allocated lines. In case of a last-level CLB miss, a hardware walk of the corresponding capability table is initiated, incurring a 24-cyde penalty. If the walk is successful in locating the appropriate translation, it means that an LLC line was allocated at that address and the cached translation in the CLB was evicted at some point due to capacity constraints. This would result in the missed entry being brought back into the CLB (potentially evicting the oldest entry), after which the rest of the hit procedure is resumed. Note that last-level CLB evictions are strictly restricted to occur within the same trust domain, ensuring that any given thread will not be able to influence the timing of a thread that belongs to another domain. ff the capability table walk is unsuccessful, a new capability request is issued.

In accordance with various embodiments of the present disclosure, no significant changes are made to the organization of the data and tag arrays of the caches 50 themselves, allowing them to be split into the number of ways given by the associativity of the cache, avoiding the complexity entailed by large monolithic cache designs. However, since a capability register 65 already provides us with the cache line number, systems and methods of the present disclosure are able to directly identify and access the appropriate set and way in which the data can be found, allowing it to forgo the tag comparison logic post-indexing. Note that this also eliminates the need for storing physical address tags in the tag array.

The caches 50 of an aspect of an embodiment of the present disclosure do not require any additional ports to be added to the SRAM arrays, as the logic pertaining to the capability lookup and access rights verification occur prior to and are independent of the SRAM access and readout procedures, and are pipelineable.

Since the L1 cache is virtually addressed (e.g., the virtual address-domain ID pair is used for obtaining a capability), to maintain inclusiveness, for each included cache line in the L2, various embodiments provide a direct link to the corresponding line in L1 by maintaining a special set of inclusion link (IL) bits as part of L2's tag array. The IL bits essentially point to the upper-level capability register, enabling CLB lookup to be bypassed during the potential invalidation of an included line. The IL bits may be updated as part of handling an upper-level cache miss, which already entails copying data over from the lower-level line to the upper-level line, necessitating the lookup of both CLB entries.

Figure 5:
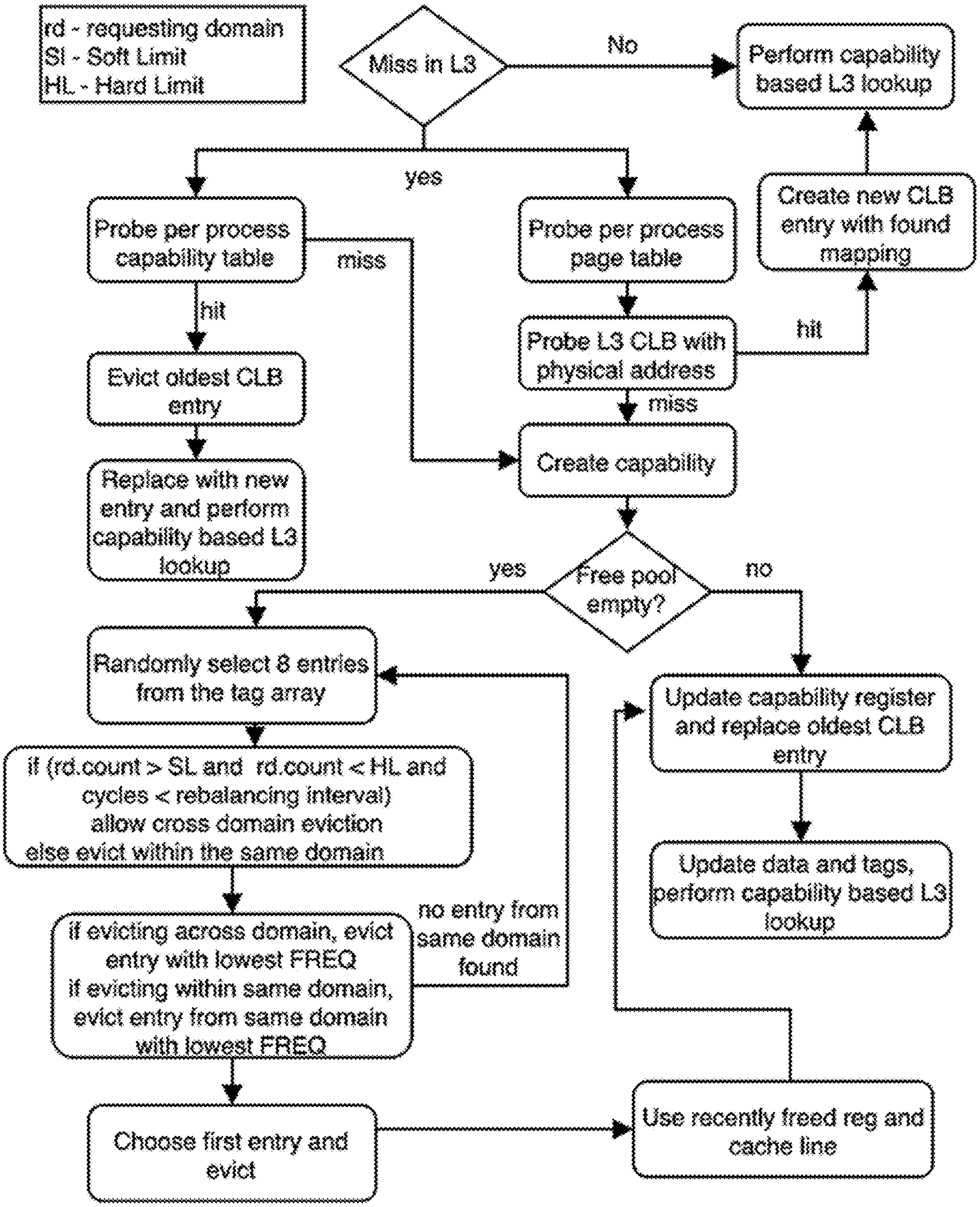
FIG. 5 presents a flowchart for a last-level cache (LLC) replacement policy, in accordance with various embodiments of the present disclosure.

FIG. 5 presents a flowchart for an LLC replacement policy, in accordance with various embodiments of the present disclosure. Accordingly, since caches 50 of an aspect of an embodiment of the present disclosure employ a fully associative allocation strategy, implementing recency-based replacement would be inefficient due to the overhead of having to maintain and traverse large tree structures upon every access. Various embodiments instead turn to a randomized frequency-based policy that maintains a 4-bit saturating counter per cache line. The counter can be initialized to a small non-zero value (to prevent immediate eviction), which is incremented upon every access and decremented upon reaching a preset expiration interval. In an exemplary implementation, the counter starts at 5 and the expiration interval is set to 64, cycles for L1I cache, 128 cycles for L1D cache, 512 cycles for L2, and 4096 cycles for L3. During cache replacement, eight cache lines are chosen at random, forming the candidate set of victim lines for replacement. Among these candidates, the most infrequently used line that belongs to the same trust domain as the currently running thread is chosen as the victim.

Further, in accordance with goals for maintaining fairness and availability, the replacement algorithm can be extended as follow. First, hard and soft limits on the number of capabilities granted for each trust domain are imposed. These limits may be configured dynamically by the system administrator or the runtime management engine. Second, counters are maintained to track the number of capabilities granted (and thus the number of lines allocated) for each domain. If the cache 50 contains available lines, any new allocation request is granted, as long as the counter has not reached its hard limit. As soon as the counter reaches its hard limit, all further cache line allocation requests are granted only upon the successful replacement of an already allocated line that belongs to the same trust domain, ensuring that no single domain is allowed to monopolize the available cache resources. On the other hand, if the cache 50 is full and the counter has not yet reached its soft limit, a rebalancing procedure is initiated to improve fairness. A rebalancing operation involves evicting lines belonging to a domain that has exceeded its soft limit; with the constraint that only one eviction per rebalancing interval is allowed. To limit the amount of cross-domain occupancy information leaked, the rebalancing interval may be configured to be a very long time (100,000 cycles in an exemplary implementation).

In a multicore processor, threads running on different cores may share data, requiring shared access to a last-level cache line. Various embodiments consider two types of sharing: (a) location-aware sharing, where pages that map to the same physical location on the disk are shared among different threads (e.g., shared libraries), and (b) content-aware sharing, where the system coalesces unrelated pages with identical contents (aka memory deduplication).

If the threads belong to the same trust domain, sharing is implicitly allowed as the two threads would use the same physical address-domain ID pair to access the shared last-level CLB entry. If the threads belong to different trust domains, sharing would need to be intentionally permitted by and agreed upon by both threads. To check if cross-domain sharing is permitted, the last-level CLB lookup is extended as follows. First, the model-specific register encoding cross-domain sharing and invalidation policies are looked up for the thread requesting access to a potentially shared line. Second and in parallel, during the CLB lookup, it is checked if a valid CLB entry exists for the physical address being probed and the domain IDs not matching, in which case, the capability register pointed to by the CLB entry is looked up to examine whether its permissions vector has the share bit turned on, indicating that cross-domain sharing has been allowed by the owner of the cache line.

Thus, if both threads mutually agree to share the cache line across domains, a new last-level CLB entry is created that links to the same capability register and is tagged with the requester/sharer thread's physical address and domain ID pair. As misses are serviced up the hierarchy, the capabilities providing access to the line's copies in each core's private caches would inherit the same permissions as the ones in the LLC capability. On the other hand, if sharing is disallowed by either thread, a trap is issued to the operating system instructing it to remap the virtual page to a copy of the underlying physical page, similar to copy-on-write.

Note that this enforces the principle of intentionality as the decision to share a line across domains is made only after both threads explicitly declare their intent to share a capability, and all sharers are further bound by the permissions initially burned to and contained within the capability. This, for example, allows for implementing a restricted mode of sharing by disabling write and invalidate permissions.

Current multicore processors maintain in-cache directories that keep track of the state of every line, alongside a list of cores that store a copy of the line in their respective private caches, and resolve coherence issues by issuing invalidation requests to all cores holding stale copies. In an inclusive hierarchy, caches of an aspect of an embodiment of the present disclosure are also able to seamlessly take advantage of the same directory coherence mechanisms. This is because in-cache directories only extend the LLC tag array to maintain directory information, and the LLC tag array in caches of an aspect of an embodiment of the present disclosure can be probed indirectly by looking up the last-level CLB using a physical address and domain ID pair. When the LLC is non-inclusive, a separate physically tagged full directory may be employed to track shared L2 lines and their corresponding capabilities. In either case, when a coherence transaction fails due to misconfigured permissions in the capability (e.g., when reading, writing, and sharing are allowed, but invalidation is disallowed), a suitable exception is raised.

In SMT designs, private caches are shared between the threads running on the same physical core. To prevent a co-located thread from exploiting contention in the CLB and influence the timing behavior of another, in various embodiments, systems and methods of the present disclosure provision each private CLB to be as large as double the hard limit and restrict each thread to only evict its own entries in the CLB.

Moreover, since exemplary L1 CLBs are virtually addressed, we run the risk of incurring synonym aliases (different virtual addresses point to shared data at the same physical address) and homonym aliases (same virtual address from different threads point to data at different physical addresses). Note that we already have the ability to detect synonym aliases and securely share capabilities through the previously discussed procedures. To eliminate homonym aliases, the L1 CLB lookup procedure can be extended to also include logical core ID alongside the virtual address and domain ID pair, in various embodiments.

In addition to being spatially shared by threads running concurrently on different logical/physical cores, cache resources may be temporally shared by threads transitioning in and out of the central processing unit (CPU) (processor 10) through context switches. As discussed earlier, the L1 CLBs are required to be flushed as soon as a context switch is initiated, much like the TLBs, but with the restriction that they are atomically written back to their corresponding capability tables. Upon returning from a context switch, the L1 CLBs (512 and 768 entries for L1I and L1D respectively) are restored from their capability tables (incurring an additional 3.4 μs). Additionally, the L2 and L3 CLBs are selectively flushed in that only those entries in the CLB that belong to the currently running thread (identifiable through the logical core ID) are invalidated. Since the L2 and L3 CLBs are organized as multiple banks, this operation can be performed in parallel. However, unlike the L1 CLBs, e the L2 and L3 CLB entries are not restored upon a context switch. Instead, they are allowed to be demand-fetched.

In various embodiments, upon a context (CTX) switch, the incoming thread could potentially evict the cache lines of the outgoing thread if they belong to the same domain. Note that an eviction operation necessarily triggers the revocation of a capability, which entails two key operations. First, the valid bit within the capability register 65 is cleared before it is released into the free list. Second, the corresponding entry in the CLB 60 is invalidated, if available, so that future accesses to the line being evicted will be detected as misses. However, if the line being evicted belongs to a thread that has been switched out of execution, the corresponding L1 CLB entry will not be found (as L1 CLBs are flushed upon a context switch) and hence will not be invalidated. This means that when the owner thread switches back into execution, a stale L1 CLB entry that corresponds to an evicted line could be restored from the capability table. In this case, such an entry would either point to (1) an invalid register in the free list whose valid bit has been zeroed out, or (2) a valid register that was re-allocated to hold a different capability. The former case is treated as a miss and a new capability is issued. In the latter case, the physical tag and domain ID bits contained in the reallocated capability are examined. If both of them match, the access is treated as a hit. If only the physical tag matches, a decision to share capabilities is made. If neither of them match, a miss is detected and a new capability is issued.

Next, a discussion is presented of how the security properties enforced by an aspect of an embodiment of the present disclosure protect against several classes of cache attacks.

First, Conflict-Based Attacks rely on contending for shared cache resources with a co-resident victim to glean sensitive information. This involves constructing an eviction set of addresses that map to a particular cache set that the attacker and the victim contend for, thereby allowing the attacker to execute and time its own set of accesses, with the difference in the hit/miss timing revealing information about a victim's data-dependent cache access behavior. An aspect of an embodiment of the present disclosure mitigates these attacks in various ways. First, but not limited thereto, it significantly impedes eviction set construction by decoupling the address from the physical location (i.e., cache set). Second, but not limited thereto, it prevents cross-domain conflicts by restricting a thread from evicting lines outside of its domain.

Reuse-Based Attacks leverage shared virtual memory (such as shared libraries or page deduplication), and the ability to flush a shared cache line by the virtual address. In this case, the attacker may observe victim accesses to the shared cache line by either tinting flushes or reload operations to that line. Since the default policy in an aspect of an embodiment of the present disclosure is to disallow sharing of cache lines between two distrusting parties, these attacks are completely mitigated.

Stealthier variants of cache attacks have been proposed that exploit replacement and write policies. These attacks hinge on influencing the replacement states of a victim's cache line that shares a set with the attacker. In caches of an aspect of an embodiment of the present disclosure, these attacks are not possible as cache replacement can occur only within a trust domain. The only exception to this is when a thread meets its hard allocation limit, but even in that case, the rate at which information is leaked is extremely small, since a strict limit that only one cross-domain eviction may occur within a 100,000 cycle interval is imposed, in various embodiments.

Next, Van Schaik, et al. describe an indirect cache attack on systems employing way- or set-based cache partitioning, where an attacker abuses hardware modules such as the page table walker as confused deputies to access trusted cache partitions. See Stephan Van Schaik et al., "Malicious Management Unit: Why Stopping Cache Attacks in Software Is Harder Than You Think," USENIX Security (2018). These attacks are possible because the privileged entities acting as confused deputies access trusted partitions based on their own access rights on behalf of the attacker, even though the system's access control policy disallows the attacker from explicitly accessing trusted partitions. An aspect of an embodiment of the present disclosure thwarts these attacks through safe delegation of access rights via the per-thread capabilities contained in the CLB. This, for example, prevents an attacker from obtaining elevated access rights by abusing a trusted hardware or software module, as the cache lines that that module can access on behalf of the attacker are still limited by the capabilities granted to the attacker, rather than the capabilities granted to the trusted module.

Cache Occupancy Attacks seek to observe the overall cache occupancy of a victim without directly contending for particular cache sets, and further correlate cache occupancy information with certain sensitive attributes of the victim. For example, Shusterman et al. describe a website fingerprinting attack that exploits the cache occupancy channel. See Anatoly Shusterman et al., "Robust Website Fingerprinting Through the Cache Occupancy Channel," 28th USENIX Security Symposium (USENIX Security 19) (2019), pages 639-656. Caches of an aspect of an embodiment of the present disclosure significantly mitigate cache occupancy attacks as follows. First, it imposes a hard limit on the number of capabilities that can be issued to (and thus, the number of lines that can be allocated to) any given thread.

This prevents an attacker thread from learning about the occupancy in the rest of the cache outside of its hard limit. Second, once a thread reaches its soft allocation limit and the cache is full, it is further constrained to operate only within its soft limit, thereby not allowing it to glean any more information than the fact that the cache is full. Third, when the attacker thread has not reached its soft limit and the cache is full, to ensure fairness, evictions are allowed to occur across domains, but as noted above, this process is deliberately slow, significantly limiting the attacker's ability to make accurate correlations regarding the victim's activity.

Finally, it is noted that caches of an aspect of an embodiment of the present disclosure are resilient against denial-of-service attacks as no thread is allowed to allocate beyond its hard limit, and when the cache is full, it is further restricted to operate within its soft limit, which forms the basis of our minimum guaranteed resource allocation policy.

Next, for performance modeling, the Gem5 v20 architectural simulator is used with the Ruby cache model for a detailed microarchitectural performance evaluation. A modern out-of-order superscalar processor is used with a multi-level cache hierarchy as the baseline, modeled after Intel's Icelake microarchitecture (shown in Table 1 (Baseline Configuration) below).

utilization. While the insecure baseline is modeled after the cache hierarchy in Intel's Icelake microarchitecture (Table 1), the secure baseline is implemented as follows.

In a multi-core environment, the secure baseline is a statically partitioned LLC cache with N way-partitions, where N is the number of trust domains in the system. In the present experiments, it is assumed that the number of unique trust domains are equal to the number of cores, and threads belonging to different domains are scheduled on different cores. In an SMT environment, static way-partitioning is introduced at all levels of the cache wherein the number of way partitions is set to two, the number of hardware threads within each physical core. All threads are ensured to always perform the same amount of work by limiting the number of instructions executed by each thread to 10 million dynamic instructions.

Finally, we also evaluate against an iso-storage baseline that proportionately expands the cache capacity of the Intel Icelake baseline at each level by the amount of storage added to an exemplary system in order to examine the performance lost due to extra storage that could otherwise be used to design larger caches. In this example, the iso-storage baseline employs a 36 KB L1-1; 56 KB L1-D, 576 KB L2, and 9 MB L3, as opposed to 32 KB L1-1.18 KB L1-D, 512 KB L2, and 8 MB L3 in Icelake.

TABLE 1

| | | | |
|---|---|---|---|
| Frequency: | 3.4 GHz | Number of Cores: | 1, 2, 4, 8, 12 |
| ICache: | 32 KB, 8-Way | DCache: | 48 KB, 12-way |
| Superscalar Width: | 10 μops | ROB: | 352 entries |
| Register File: | 256 INT/FP | LQ/SQ: | 128/72 entries |
| L2 Cache: | 512 KB 8-way | L3 Cache: | 8 MB 16-way |

C and C++ benchmarks from SPEC CPU 2017 suite are used to construct workloads based on the SimPoint methodology, Using PinPlay and Gem5's checkpointing feature, multiple simulation points (SimPoints) are generated that each span 100 million dynamic x86 instructions. While these SimPoints are used directly for evaluating single-threaded workloads, for a scalability analysis on SMT and multicore designs, joint SimPoints are constructed as follows. First, the applications are classified into CPU-intensive, memory-intensive, and balanced, based on the instruction-level parallelism (ILP) and memory behavior of each application. In particular, wrf, exchange, nab, and povray benchmarks are grouped into the CPU-intensive cluster; mcf, fotonik, xalancbmk, and xz into the memory-intensive cluster, and gcc, deepsjeng, leela, and perl into balanced duster, per the characterization study by Panda, et al. See Reena Panda et al., "Wait of a Decade: Did SPEC CPU 2017 Broaden the Performance Horizon?", 2018 IEEE International Symposium on High Performance Computer Architecture (HPCA) (2018). Second, joint checkpoints are created by considering SimPoint combinations within a cluster. To make simulations tractable, we limit ourselves to SimPoints that have the highest weight (e.g., the most representative region of the benchmark). Both multithreaded (2-way SMT) and multi-core (2, 4, 8, and 12-core) simulations are performed. For all the multi-core experiments, the LLC has a 75% hard limit and a 2-core design has 50% soft limit, 4-core has 25% soft limit and so on. For SMT experiments, all of the caches have a 75% and 50% hard and soft limit respectively.

For multicore and SMT experiments, the performance of an exemplary embodiment of the present disclosure is evaluated against an insecure and a secure baseline in terms of normalized throughput (i.e., instructions committed per cycle across all cores), LLC cache miss rates, and LLC For Power, Area, and Latency Estimation, a full RTL analysis is performed using Synopsys Design Compiler to estimate the latency, power, and area of the combinational logic used for capability-based lookup and replacement. In addition, McPAT is also leveraged to perform power and area estimations for the cache-like structures added.

Figure 6:
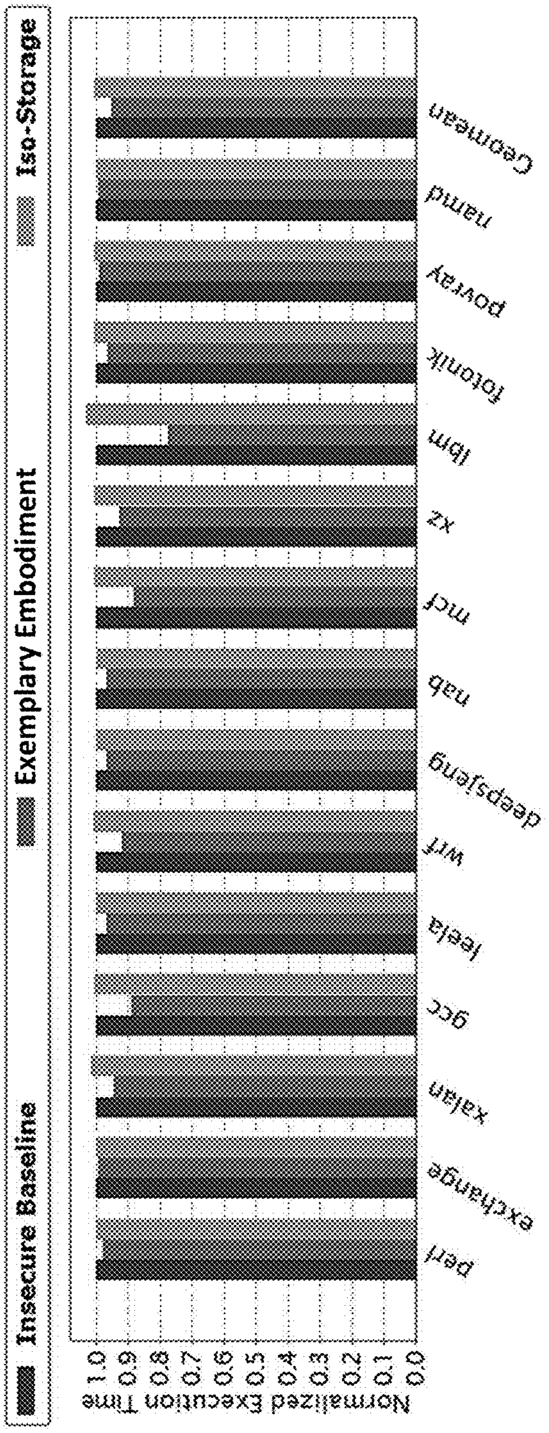
FIG. 6 shows performance results of an exemplary embodiment of the present disclosure normalized to the insecure baseline for a single core environment.

FIG. 6 shows the performance (inter-process communication (IPC)) results of an exemplary embodiment of the present disclosure normalized to the insecure baseline for a single core environment. On average, the exemplary system incurs a 4.7% slowdown over the insecure baseline that does not implement any protections against cache attacks. Note that this is heavily dominated by outliers such as the Lattice Boltzmann Method (lbm) benchmark. This minor degradation in performance for most applications can be attributed to the increased latency on the cache hit path due to the additional layer of virtualization and/or the occasional last-level CLB miss penalty that requires a DRAM access to the capability table in shadow memory.

Figure 7:
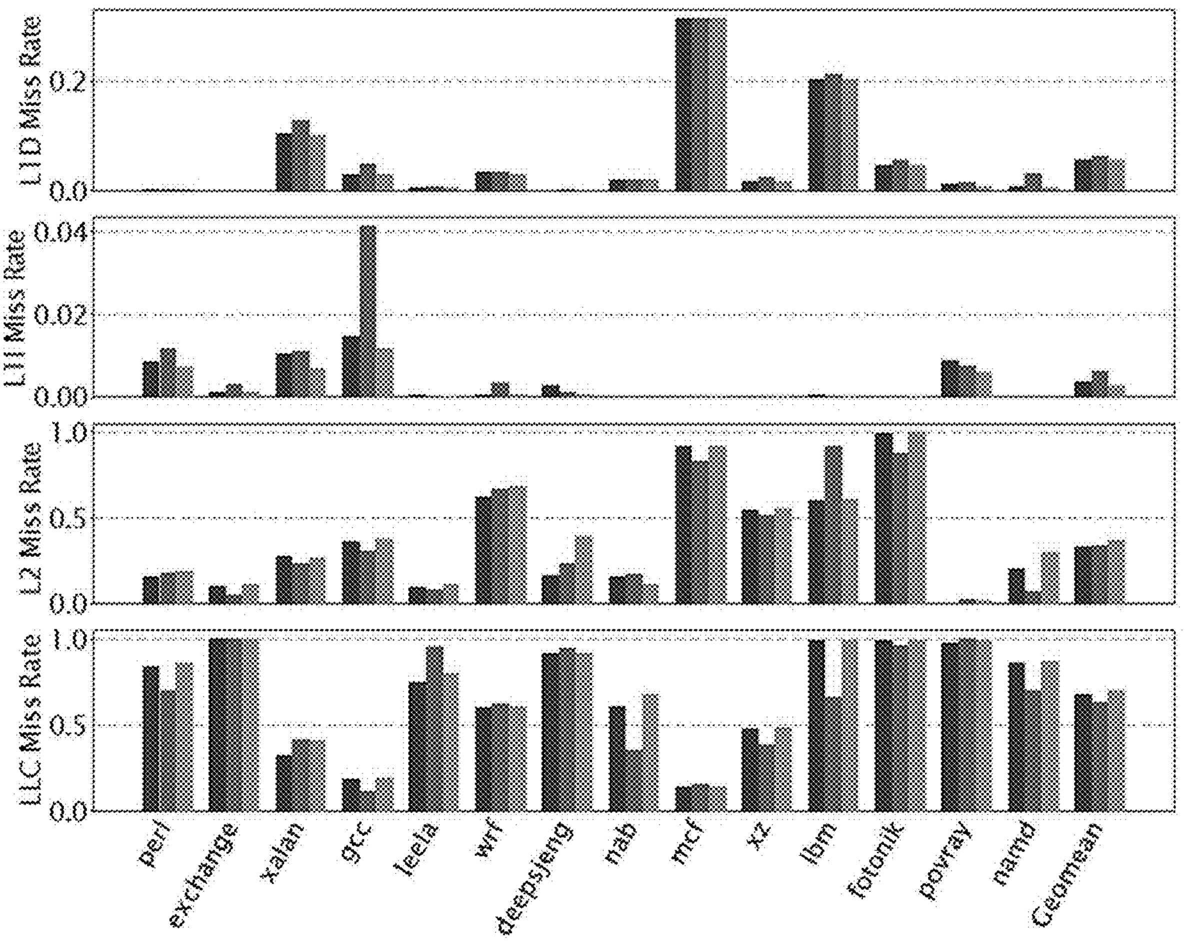
FIG. 7 shows a comparison of miss rates for an insecure baseline cache system versus an exemplary cache system of the present disclosure.

To further identify the source of the performance degradation in outliers such as lbm, we examine the cache miss rates in FIG. 7. We observe two distinct performance effects. First, since a fully-associative allocation is inherently conflict-averse, we observe what would be conflict misses in a set-associative cache routinely getting converted to cache hits in an exemplary embodiment of the present disclosure. This effect is observed in most benchmarks. Second, in applications where a majority of the conflict-induced thrashing behavior would be contained to a small number of cache sets in a conventional set-associative cache such as the insecure baseline, a fully-associative allocation strategy might hurt as those conflicting accesses would now be spread across the cache, resulting in excessive cache pollution. This effect is observed in gcc benchmark software, where some of the L1 lines get pushed to L2 due to the pollution in L1, and lbm where several L2 lines get moved to L3 due to pollution in L2. Finally, in the highly memory-intensive application, mcf, the former effect is observed, although the performance degradation is dominated by the sheer number of memory accesses that suffer due to the increased hit latency.

The iso-storage results show that systems of the present disclosure do not suffer significant additional performance degradation by trading off a small amount of cache capacity at each level for managing security metadata. Their overhead only goes up by 0.3% on average and in the worst case by 2% on L1-bound applications.

Figure 8:
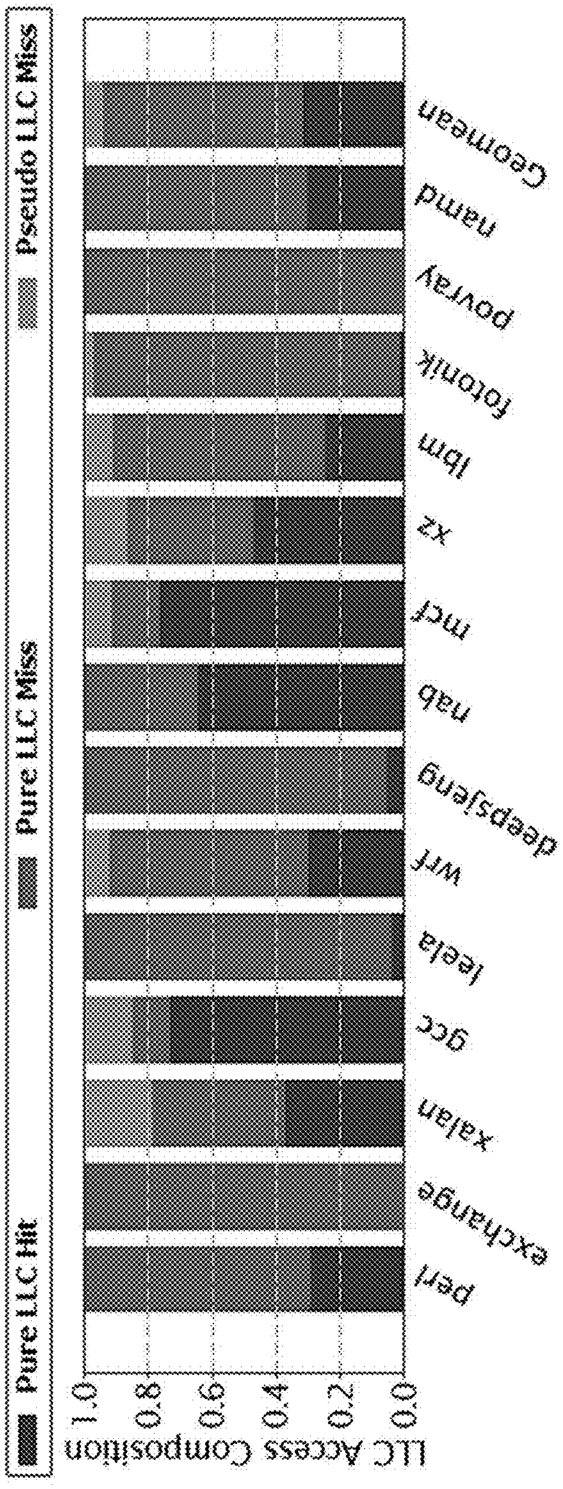
FIG. 8 shows a comparison of last-level cache accesses for an exemplary embodiment of the present disclosure.

Finally, recall that the last-level CLB is only provisioned to contain half as many entries as the number of lines in the LLC. In FIG. 8, the impact of a smaller last-level CLB on LLC accesses is examined. Accordingly, LLC accesses are divided into (a) pure LLC hits, where we observe both a CLB hit as well as an LLC hit; (b) pure LLC misses, where we observe both a CLB miss and an LLC miss; and (c) pseudo-LLC misses, where we miss in the CLB, but hit in the LLC. Clearly, from the graph, it is observed that pseudo misses account for only 5.7% of the overall LLC accesses. This overhead is only observed on LLC- and memory-bound applications (on others, compulsory LLC misses are mostly observed), and even on those applications, they benefit from locality within the CLB.

Figure 9:
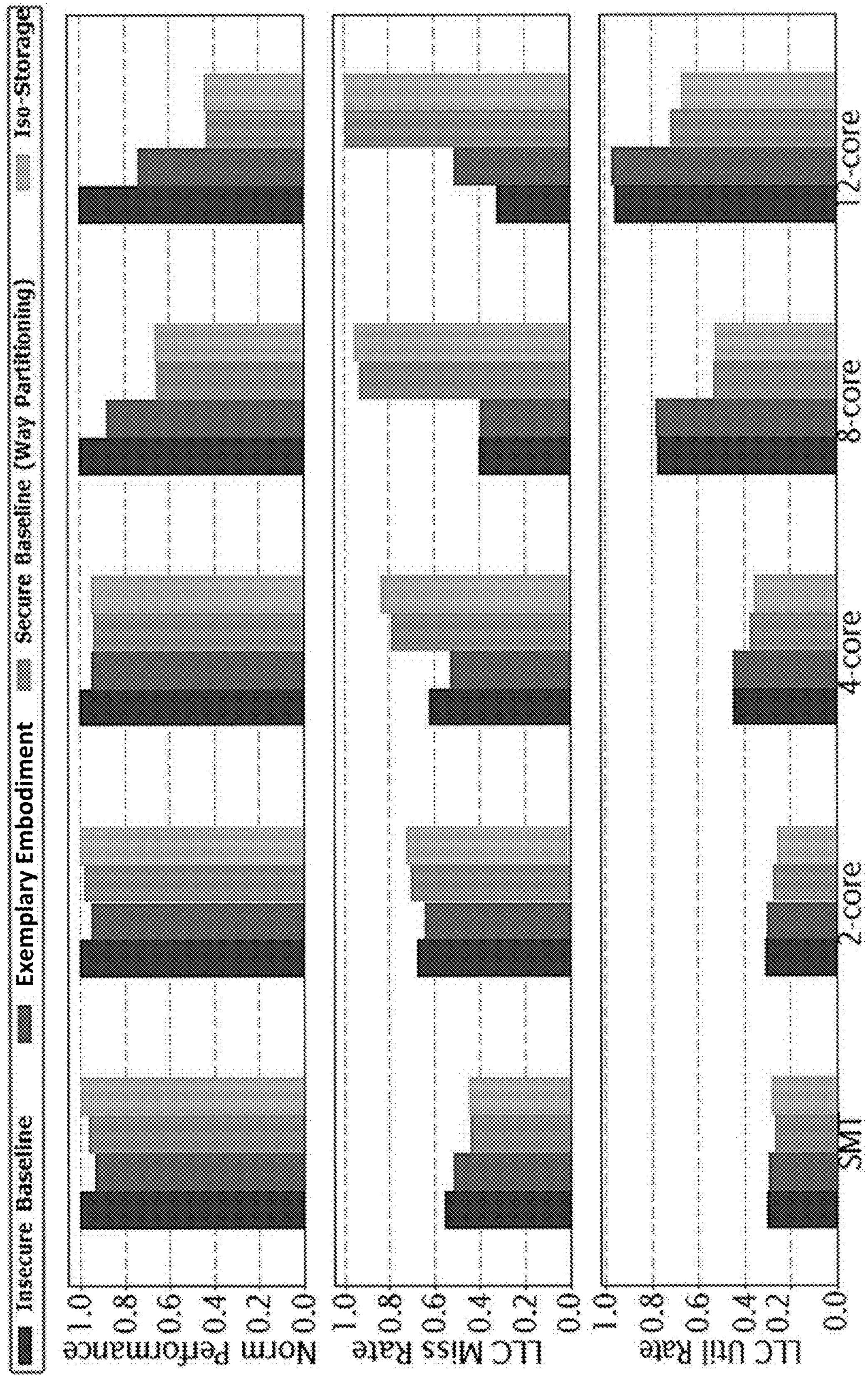
FIG. 9 shows a performance comparison for simultaneous multithreaded/multicore designs of exemplary embodiments of the present disclosure.

To evaluate the scalability of an exemplary embodiment to multiple trust domains, multiprogrammed mixed workloads are constructed, such that each program within the workload belongs to a different trust domain and is further scheduled to different hardware threads (in the SMT design) or cores (in the multicore design). FIG. 9 provides a performance comparison for SMT/Multicore designs. The top portion of FIG. 9 shows normalized throughput, the middle portion shows the LLC miss rate, and the bottom portion shows the utilization of the LLC of these workloads on a single-core SMT, 2-core, 4-core, 8-core, and 12-core designs. The utilization of the LLC is computed as the average number of valid cache lines in the LLC over the duration of the experiment. Furthermore, the values representing the averages of the performance, miss rates, scalability, and the expanded cache capacity only marginally improves the utilization of the way partitioning design.

On the other hand, an aspect of an embodiment of the present disclosure degrades much gracefully (12% and 26% slowdown in 8- and 12-core designs respectively) due to its fine-grained partitioning solution and competitive allocation policy that together not only removes the restriction on partitions having to include contiguous lines in a way, but also allow partitions to grow beyond their configured soft limits when space is available, thereby achieving low miss rates and high utilization rates that are comparable to the insecure baseline. While the lower utilization of the LLC in SMT and 2-core environments is attributed to CPU-intensive benchmarks having a lower LLC footprint, the utilization of the LLC increases as we scale to 8 and 12 cores. Overall, it is observed that an aspect of an embodiment of the present disclosure significantly outperforms the secure baseline on way partitioning (by 33% in a 4-core design and by 70& in a 12-core design), while offering substantially greater security guarantees.

Storage overheads in caches of an aspect of an embodiment of the present disclosure arise due to (1) additional hardware structures, e.g., the CLBs, the capability register files (CRFs), and the free lists maintaining available cache lines and capability registers; and (2) extra bits in the tag array. Table 2 (below) provides a detailed breakdown of storage overhead analysis incurred by these components across the hierarchy. Overall, across all levels, the exemplary system consumes 13.2% more storage than the insecure baseline, in comparison to the recent secure LLC design, MIRAGE, that adds 17-20% extra tag storage.

TABLE 2

| | | Baseline | | Embodiment | |
|---|---|---|---|---|---|
| | | I- Cache | D-Cache | I-Cache | D-Cache |
| L1 | Tag | 2.25 KB | 3.375 KB | 1.25 KB | 1.875 KB |
| | Data | 32 KB | 48 KB | 32 KB | 48 KB |
| | CLB | 0 | 0 | 3.4375 KB | 5.1562 KB |
| | CRF | 0 | 0 | 3.375 KB | 5.06 KB |
| | Free List | 0 | 0 | 1.125 KB | 1.6875 KB |
| Subtotal | 1 | 86 KB | | 103 KB | |
| L2 | Tag | 32 KB | | 30 KB | |
| | Data | 512 KB | | 512 KB | |
| | CLB | 0 | | 56 KB | |
| | CRF | 0 | | 15 KB | |
| | Free List | 0 | | 20 KB | |
| Total | | 544 KB | | 633 KB | |
| LLC | Tag | 464 KB | | 384 KB | |
| | Data | 8192 KB | | 8192 KB | |
| | CLB | 0 | | 496 KB | |
| | CRF | 0 | | 288 KB | |
| | Free List | 0 | | 416 KB | |
| Total | | 8656 KB | | 9776 KB | |
| Total | | 9286 KB (100%) | | 10512 KB (113.2%) | |

Further, the area overhead imposed by the combinational logic used for capability-based lookup and replacement is measured to be 6.8 $\mu m^2$ with negligible impact on clock latency. Additionally, the fully associative CLB accesses are banked in-order to complete within a dock cycle. Overall, a 2.5% overhead in total chip peak power and 10.2% overhead in total chip area are incurred, in comparison to the 4-core insecure baseline modeled after Intel IceLake.

Figure 10:
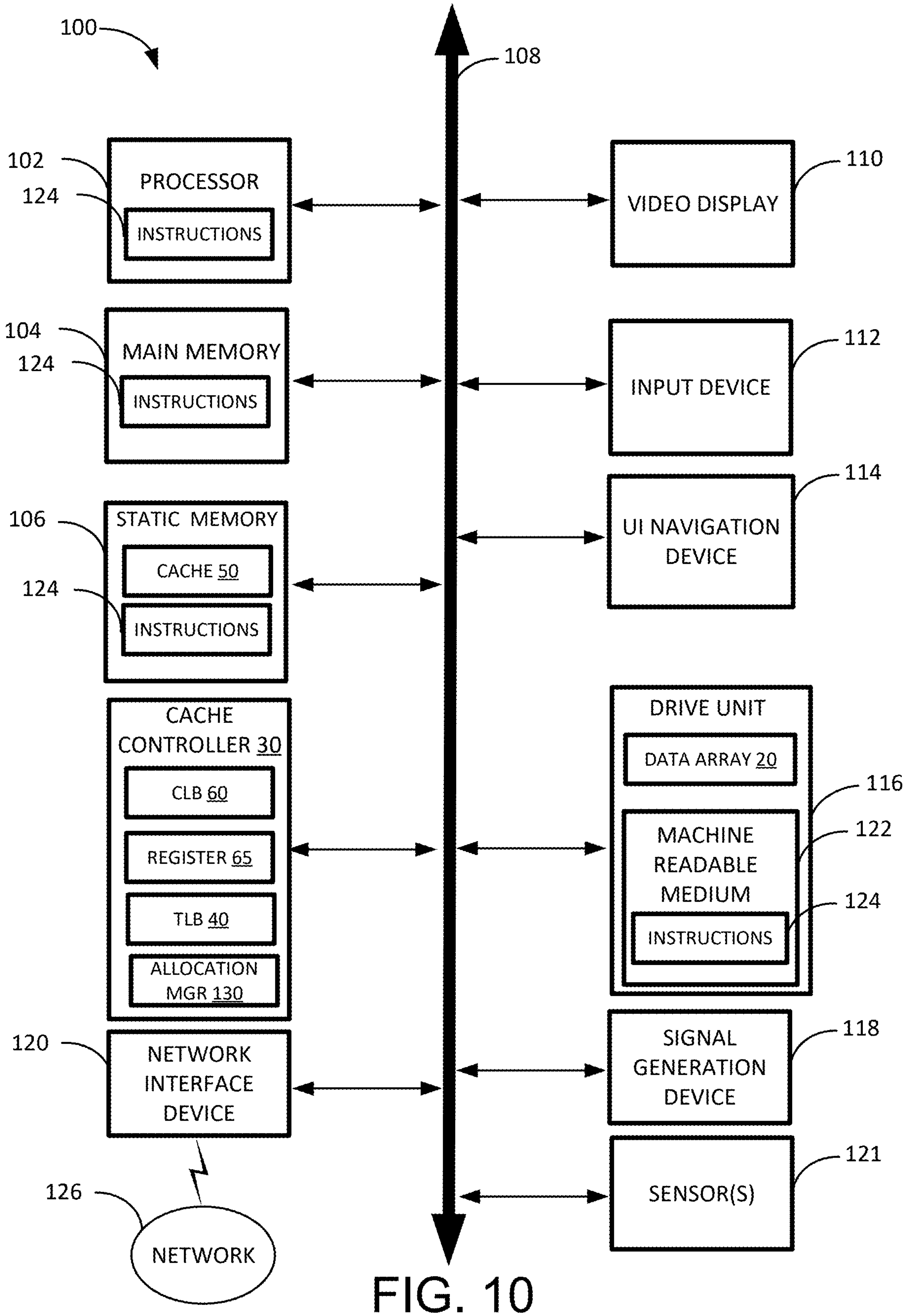
FIG. 10 is a schematic drawing of a computer system that can be used to implement various embodiments of the present disclosure.

Referring now to FIG. 10, it presents a schematic drawing of a computer system or machine that can be used to implement various embodiments of the present disclosure. Accordingly, an aspect of an embodiment of the present disclosure includes, but not limited thereto, a system, method, and computer readable medium that provides at least one of more of the following: a) capability-enhanced virtualization of caches; b) a hardware virtualization technique that allows for the secure allocation and use of physical cache resources among threads that belong to different trust domains; c) capability-based cache lookup by translating a given virtual address and domain ID pair into a capability that encodes the access rights and the allowed set of operations on the physical cache line that it grants access to; d) by constraining cache lookup to occur based on a capability, the embodiment can achieve fine-grained partitioning of the cache at the granularity of a cache line, enforcing a wide set of confidentiality, availability, and fairness guarantees, while maximizing cache utilization; and e) integrating the secure virtualization layer into modern multicore cache hierarchies. Correspondingly, FIG. 10 illustrates a block diagram of an example machine 100 upon which one or more embodiments (e.g., discussed methodologies) can be implemented (e.g., run).

Examples of machine 100 can include logic, one or more components, circuits (e.g., modules); or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment an office environment or as a server farm, while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the internet) and via one or more appropriate interfaces (e.g., Application Program Interfaces (APIs)).

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. in embodiments deploying a programmable computing system, it will be appreciated that both hardware and software architectures require consideration. Specifically, it will be appreciated that the choice of whether to implement certain functionality in permanently configured hardware (e.g., an ASIC) in temporarily configured hardware (e.g., a combination of software and a programmable processor), or a combination of permanently and temporarily configured hardware can be a design choice. Below are set out hardware (e.g., machine 100) and software architectures that can be deployed in example embodiments.

In an example, the machine 100 can operate as a standalone device or the machine 100 can be connected (e.g., networked) to other machines. In a networked deployment, the machine 100 can operate in the capacity of either a server or a client machine in server-client network environments. In an example, machine 100 can act as a peer machine in peer-to-peer (or other distributed) network environments. The machine 100 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 100. Further, while only a single machine 100 is illustrated, the term "machine" shall also be taken to include any collection of machines that individually or jointly execute a set (or multiple sets) of instructions to perform any one or more of the methodologies discussed herein.

Example machine (e.g., computer system) 100 can include a processor 102 (e.g., processor 10, a central processing unit (CPU), a graphics processing unit (GPU) or both), a main memory 104 a static memory 106 (having cache memory 50), a hardware cache controller 30 (e.g., having CLB 60, capability register 65, TLB 40, etc.), etc., some or all of which can communicate with each other via a bus 108. The machine 100 can further include a display unit 110, an alphanumeric input device 112 (e.g., a keyboard), and a user interface (UI) navigation device 411 (e.g., a mouse). In an example, the video display unit 110, input device 112 and UI navigation device 114 can be a touch screen display. The machine 100 can additionally include a storage device (e.g., drive unit) 116, a signal generation device 118 (e.g., a speaker}; a network interface device 120, and one or more sensors 121, such as a global positioning system (CPS) sensor, compass, accelerometer, or other sensor.

The storage device 116 can include a machine readable medium 122 on which is stored one or more sets of data structures or instructions 124 (e.g., data array 20, software) embodying or utilized by any one or more of the methodologies or functions described herein. The instructions 124 can also reside, completely or at least partially, within the main memory 104, within static memory 106, or within the processor 102 during execution thereof by the machine 100. In an example, one or any combination of the processor 102, the main memory 104, the static memory 106, or the storage device 116 can constitute machine readable media.

While the machine readable medium 122 is illustrated as a single medium, the term "machine readable medium" can include a single medium or multiple media (e.g., a centralized or distributed database, and/or associated caches and servers) that are configured to store the one or more instructions 124. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, optical, and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 124 can further be transmitted or received over a communications network 126 using a transmission medium via the network interface device 120 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

An aspect of an embodiment of the present disclosure provides, among other things, a novel virtualization solution for caches that offers protection against conflict-based, reuse-based, occupancy-based, confused deputy, and denial-of-service attacks. One of the keys to an aspect of the present disclosure is, but not limited thereto, a secure virtualization layer that translates an address-domain ID pair into a capability that encodes the access rights and the permitted set of operations on a cache line, enforcing the principle of least privilege. By decoupling the address from the physical location of a cache line, an aspect of the present disclosure enables fully associative allocation and fine-grained cache partitioning, maximizing utilization and amortizing the virtualization cost. The exemplary system incurs an average slowdown of 4.7% over an insecure baseline, while consuming 2.5% more in peak power and 10.2% in area. It can gracefully scale to multiple domains, outperforming way partitioning-based solutions by as much as 70%.

An aspect of an embodiment of the present disclosure provides a system, method, and computer readable medium for providing, among other things, at least one of more of the following: a) capability-enhanced virtualization of caches; b) a hardware virtualization technique that allows for the secure allocation and use of physical cache resources among threads that belong to different trust domains; c) capability-based cache lookup by translating a given virtual address and domain ID pair into a capability that encodes the access rights and the allowed set of operations on the physical cache line that it grants access to; d) by constraining cache lookup to occur based on a capability, the embodiment can achieve fine-grained partitioning of the cache at the granularity of a cache line, enforcing a wide set of confidentiality, availability, and fairness guarantees, while maximizing cache utilization, and e) integrating the secure virtualization layer into modern multicore cache hierarchies.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention in addition to those described herein, will be apparent to those of skill in the art from the disclosed description and accompanying drawings. Accordingly, the invention is to be considered as limited only by the spirit and scope of the disclosure (and claims) including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, background, abstract, drawing figure, etc.) of this application, unless dearly specified to the contrary, there is no requirement for the inclusion in any claim herein or of any application claiming priority hereto of any particular described or illustrated activity or element any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless dearly specified to the contrary, there is no requirement for any particular described or illustrated activity or element, any particular sequence or such activities, any particular size, speed, material, dimension, frequency, or any particular interrelationship of such elements. Accordingly, the descriptions and drawings are to be regarded as illustrative in nature, and not as restrictive. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y.'"

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the present disclosure. All such modifications and variations are intended to be included herein within the scope of this disclosure.

We claim:

1. A computer system comprising:

a computing device comprising a processor and a memory; and machine-readable instructions stored in the memory that, when executed by the processor, cause the computing device to at least:

execute a thread of programmable instructions, wherein the thread includes a request for data to be retrieved from the memory, wherein the request for data includes a virtual memory address; and process the request for the data by:

translating the virtual memory address and a trust domain identifier associated with the thread being executed into a capability token value that is associated with a physical capability register, where the capability register contains one or more cache line numbers that are allocated to a capability token associated with the thread being executed, a permissions vector that defines a set of operations allowed on the allocated cache lines, and a physical memory tag for each of the cache line numbers contained in the capability register;

determining that a cache line in cache memory of the computing device is allocated to the virtual memory address included in the request for data;

searching for and retrieving contents of the physical capability register from a capability lookaside buffer that is associated with the capability token value; and granting access to the cache line in the cache memory to the thread being executed if the contents of the physical capability register indicate that the cache line is one of the one or more cache line numbers that are allocated to the capability token associated with the thread being executed and the set of operations, defined by the permissions vector, allowed on the allocated cache lines permit access to the cache line.

2. The system of claim 1, wherein the permissions vector is burned into the physical capability register to indicate whether the allocated line can be read from, written to, invalidated, or shared.

3. The system of claim 1, wherein the computing device is further caused to verify the physical memory tag in the capability register against a physical address obtained from a transaction-lookaside buffer of the computing device.

4. The system of claim 1, wherein multiple threads of programmable instructions are associated with a same capability token, wherein a translation of a first trust domain identifier for a first thread and a first virtual memory address produces a first capability token and a translation of a second trust domain identifier for a second thread and a second virtual memory address produces the same first capability token, wherein the multiple threads include the first thread and the second thread.

5. The system of claim 1, wherein the computing device is further caused to:

add a new cache line to the cache memory in response to detection of a cache miss for a requesting thread of programmable instruction; and issue a new capability token in the capability lookaside buffer, where the new capability token is associated with a physical capability register that specifies the new cache line and a new set of permission vectors associated with the new cache line.

6. The system of claim 5, wherein the new cache line is automatically authorized to be added to the cache memory for the requesting thread when a total number of cache lines allocated to the requesting thread is less than or equal to a predefined soft limit value.

7. The system of claim 5, wherein the new cache line is added to the cache memory for the requesting thread as a replacement to a current cache line entry in the cache memory when a total number of cache lines allocated to the requesting thread is more than a predefined hard limit value.

8. A computing method comprising:

executing, by a computing device, a thread of programmable instructions, wherein the thread includes a request for data to be retrieved from memory of the computing device, wherein the request for data includes a virtual memory address; and processing, by the computing device, the request for the data by:

translating the virtual memory address and a trust domain identifier associated with the thread being executed into a capability token value that is associated with a physical capability register, where the capability register contains one or more cache line numbers that are allocated to a capability token associated with the thread being executed, a permissions vector that defines a set of operations allowed on the allocated cache lines, and a physical memory tag for each of the cache line numbers contained in the capability register;

determining that a cache line in cache memory of the computing device is allocated to the virtual memory address included in the request for data;

searching for and retrieving contents of the physical capability register from a capability lookaside buffer that is associated with the capability token value; and granting access to the cache line in the cache memory to the thread being executed if the contents of the physical capability register indicate that the cache line is one of the one or more cache line numbers that are allocated to the capability token associated with the thread being executed and the set of operations, defined by the permissions vector, allowed on the allocated cache lines permit access to the cache line.

9. The method of claim 8, wherein the permissions vector is burned into the physical capability register to indicate whether the allocated line can be read from, written to, invalidated, or shared.

10. The method of claim 8, further comprising verifying, by the computing device, the physical memory tag in the capability register against a physical address obtained from a transaction-lookaside buffer of the computing device.

11. The method of claim 8, wherein multiple threads of programmable instructions are associated with a same capability token, wherein a translation of a first trust domain identifier for a first thread and a first virtual memory address produces a first capability token and a translation of a second trust domain identifier for a second thread and a second virtual memory address produces the same first capability token, wherein the multiple threads include the first thread and the second thread.

12. The method of claim 8, further comprising:

adding, by the computing device, a new cache line to the cache memory in response to detection of a cache miss for a requesting thread of programmable instruction; and issuing, by the computing device, a new capability token in the capability lookaside buffer, where the new capability token is associated with a physical capability register that specifies the new cache line and a new set of permission vectors associated with the new cache line.

13. The method of claim 12, wherein the new cache line is automatically authorized to be added to the cache memory for the requesting thread when a total number of cache lines allocated to the requesting thread is less than or equal to a predefined soft limit value.

14. The method of claim 12, wherein the new cache line is added to the cache memory for the requesting thread as a replacement to a current cache line entry in the cache memory when a total number of cache lines allocated to the requesting thread is more than a predefined hard limit value.

15. A non-transitory, computer-readable medium comprising machine-readable instructions that, when executed by a processor of a computing device, cause the computing device to at least:

execute a thread of programmable instructions, wherein the thread includes a request for data to be retrieved from the memory, wherein the request for data includes a virtual memory address; and process the request for the data by:

translating the virtual memory address and a trust domain identifier associated with the thread being executed into a capability token value that is associated with a physical capability register, where the capability register contains one or more cache line numbers that are allocated to a capability token associated with the thread being executed, a permissions vector that defines a set of operations allowed on the allocated cache lines, and a physical memory tag for each of the cache line numbers contained in the capability register;

determining that a cache line in cache memory of the computing device is allocated to the virtual memory address included in the request for data;

searching for and retrieving contents of the physical capability register from a capability lookaside buffer that is associated with the capability token value; and granting access to the cache line in the cache memory to the thread being executed if the contents of the physical capability register indicate that the cache line is one of the one or more cache line numbers that are allocated to the capability token associated with the thread being executed and the set of operations, defined by the permissions vector, allowed on the allocated cache lines permit access to the cache line.

16. The non-transitory, computer-readable medium of claim 15, wherein the permissions vector is burned into the physical capability register to indicate whether the allocated line can be read from, written to, invalidated, or shared.

17. The non-transitory, computer-readable medium of claim 15, wherein the computing device is further caused to verify the physical memory tag in the capability register against a physical address obtained from a transaction-lookaside buffer of the computing device.

18. The non-transitory, computer-readable medium of claim 15, wherein multiple threads of programmable instructions are associated with a same capability token, wherein a translation of a first trust domain identifier for a first thread and a first virtual memory address produces a first capability token and a translation of a second trust domain identifier for a second thread and a second virtual memory address produces the same first capability token, wherein the multiple threads include the first thread and the second thread.

19. The non-transitory, computer-readable medium of claim 15, wherein the computing device is further caused to:

add a new cache line to the cache memory in response to detection of a cache miss for a requesting thread of programmable instruction; and issue a new capability token in the capability lookaside buffer, where the new capability token is associated with a physical capability register that specifies the new cache line and a new set of permission vectors associated with the new cache line.

20. The non-transitory, computer-readable medium of claim 19, wherein the new cache line is automatically authorized to be added to the cache memory for the requesting thread when a total number of cache lines allocated to the requesting thread is less than or equal to a predefined soft limit value, wherein the new cache line is added to the cache memory for the requesting thread as a replacement to a current cache line entry in the cache memory when a total number of cache lines allocated to the requesting thread is more than a predefined hard limit value, wherein the predefined soft limit value is less than the predefined hard limit value.

* * * * *